United States Patent [19]

Eschrich et al.

[11] Patent Number: 4,742,461
[45] Date of Patent: May 3, 1988

[54] METHOD OF CONTROLLING FRICTIONALLY ENGAGEABLE COUPLINGS OF AN AUTOMATIC TRANSMISSION OF A MOTOR VEHICLE

[75] Inventors: Gerhard Eschrich, Gerlingen; Achim Schreiber, Schwieberdingen; Manfred Schwab, Gerlingen, all of Fed. Rep. of Germany

[73] Assignee: Robert Bosch GmbH, Stuttgart, Fed. Rep. of Germany

[21] Appl. No.: 782,052

[22] Filed: Sep. 30, 1985

[30] Foreign Application Priority Data

Oct. 3, 1984 [DE] Fed. Rep. of Germany ....... 3436190

[51] Int. Cl.$^4$ ................. B60K 41/08; G05D 13/02; G05D 17/02
[52] U.S. Cl. ................... 364/424.1; 74/861; 74/867
[58] Field of Search ............... 364/424.1; 74/731, 861, 74/862, 866, 867

[56] References Cited

U.S. PATENT DOCUMENTS

| 3,659,481 | 5/1972 | Espenschied et al. | 74/731 |
| 4,543,856 | 10/1985 | Klatt | 74/866 |
| 4,584,905 | 4/1986 | Eschrich et al. | 74/866 |
| 4,611,507 | 9/1986 | Burkel et al. | 74/866 |
| 4,651,593 | 3/1987 | Aoki et al. | 74/731 |

FOREIGN PATENT DOCUMENTS 2843183 4/1980 Fed. Rep. of Germany .

Primary Examiner—Felix D. Gruber
Attorney, Agent, or Firm—Frishauf, Holtz, Goodman & Woodward

[57] ABSTRACT

Reference values are stored for various conditions of gear shift operations of a vehicle motor of a particular type and model for various motor speed and load combinations, the reference values having a magnitude characterizing the gear shifting operation, for example the time interval required from the appearance of a gear shift command until the end of slip in a coupling indicates that the gear shift is complete. As the vehicle is driven, actual values of this magnitude are stored and averaged for a predetermined number of shift operations under the same class of condition. Correction values for the pressure of hydraulic fluid of the gear shift control, originally set at zero for all conditions, are determined by comparison of reference values with average actual values and stored. In subsequent driving, the stored correction values are used to control the pressure of the hydraulic medium to maintain a standard of comfort for all shift operations and new average actual values are used from time to time to modify the correction values for compensation of aging effects.

34 Claims, 3 Drawing Sheets

FIG. 3a t0 (ms)

| L | n1 | n2 | n3 | n4 | n4 | nm |
|---|---|---|---|---|---|---|
| L5 | | | | | | |
| L4 | 600 | 550 | 500 | 500 | 450 | |
| L3 | | | | | | |
| L2 | | | | | | |
| L1 | 600 | 600 | 550 | 550 | 500 | |

FIG. 3b t1 (ms)

| | | | | |
|---|---|---|---|---|
| | | | | |
| 400 | 560 | 560 | 550 | 530 |
| | | | | |
| | | | | |
| 510 | 520 | 510 | 510 | 500 |

L / nm $K \cdot \Delta p = K \cdot 0{,}1\,\text{bar}$

| | | | | |
|---|---|---|---|---|
| 0 | 0 | 0 | 0 | 0 |
| | | | | |
| | | | | |
| 0 | 0 | 0 | 0 | 0 |

| | | | | |
|---|---|---|---|---|
| 590 | 560 | 500 | 500 | 450 |
| | | | | |
| | | | | |
| 600 | 600 | 550 | 550 | 500 |

L / nm $K \cdot \Delta p = K \cdot 0{,}1\,\text{bar}$

| | | | | |
|---|---|---|---|---|
| 0 | 0 | 1 | 1 | 2 |
| | | | | |
| | | | | |
| −2 | −2 | −1 | −1 | 0 |

METHOD OF CONTROLLING FRICTIONALLY ENGAGEABLE COUPLINGS OF AN AUTOMATIC TRANSMISSION OF A MOTOR VEHICLE

This invention concerns methods of electronic control of an automatic transmission of a motor vehicle in which shifting between various gear ratios is performed by frictionally engageable couplings that are electrically controlled usually through hydraulic control members, such as magnetic valves.

It is known to control the pressure of the hydraulic work medium in automatic transmissions that serves for actuating the frictionally engageable elements of the transmission in a manner dependent upon various operating parameters of the motor vehicle in which the transmission is installed. Thus, in German Patent No. 19 32 986, the pressure setting is performed by electronic control with reference to prescribed characteristic data in the form of pressure curves. Compensation for changes in operating parameters by aging effects or for variation in parameters among individual cases as the result of random variations found in individual transmissions or vehicles of the same model and year that are mass produced, cannot be obtained by or in that known pressure control system. The friction values of friction discs, drums or bands and the characteristic curves of pressure regulators or of springs, or of the torque produced by the vehicle engine, are subject to these statistical variations, so that in the known system above-referred to, on the one hand, gear shifting quality variations result and on the other hand, strict tolerances are made necessary for the parts of the transmission and of the control system. Highly unfavorable cost factors are therefore encountered.

For relief of this situation, closed control loops were recommended, as for example in German published patent application (OS) Nos. 28 43 183 and 32 05 767. These closed control loops have the disadvantage, however, that a control magnitude (error signal) suitable for taking account of the necessary dynamic reactions is necessary. As the result of the "dead intervals" involved, in transmissions controlled by those loop servo systems stability problems are to be expected in the gear train as a whole and noticeable control deviations (for producing error signals) are necessary before the control comes in to make a correction. The result is poor riding comfort during gear shifting.

SUMMARY OF THE INVENTION

It is an object of the present invention to provide an electrically controllable transmission in which shifting from one gear to another can be made to take place without causing riding discomfort, by means that do not require close manufacturing tolerances for the gear chain or the transmission control, and do not involve deterioration as a result of aging effects. Briefly, frictional engagement elements are used for gear shifting and an actual frictional engagement measure is compared with a stored reference value. Correction values are stored for use when more than a certain difference is found in the compressors. The correction value has an effect that corrects a control magnitude for the frictional coupling in the sense of adaptive control. In electrohydraulic actuation the control magnitude which is corrected, is the hydraulic pressure. Actual measured magnitude in the operation can be either the duration of the engagement operation or of the slip between frictional elements in a frictionally engageable coupling, or else the gradient of the transmission input shaft speed during the slipping of the frictional elements. The gradient of the transmission input shaft speed during slip between frictional elements is a magnitude dependent on that duration of slip. The same is true of the interval between the appearance of a gear shift order and the end of the slip duration interval.

The method of the invention has the advantage that random variations between transmissions and vehicles of the same model and year, and also aging effects, can be compensated to produce a quality of gear shifting that is essentially uniform, by continuous adaptive adjustment of the shift-producing interval. In consequence, greater tolerances can be permitted for the necessary positioning members and other such components, leading to overall economy of the transmission. Since the parameter variation and changes which produce the problem here in question involve no high frequency disturbances, but only very low frequency drifts for long term deviations away from desired values, adaptive control is particularly well suited to deal with the problem. This adaptive control can be readily and economically obtained by extension of the use of software, in contrast to the conventional electronic transmission controls.

A further improvement of gear shifting comfort and exact fitting of the control characteristics to different relations between engine load and engine speed can be obtained by non-volatile storage devices in which the reference values addressable by various measured values and the resulting correction values can be entered and preserved in load/speed characteristic fields for various range steps of engine load and engine speed. EEPROM and buffered RAM units are useful for this.

It is also advantageous to use time filtering (averaging) of individual values from a number of shift operations, to obtain the actual measured values for comparison with reference values, in order to minimize the effect of disturbing magnitudes or random variations in operating parameters.

BRIEF DESCRIPTION OF THE DRAWINGS

The invention is further described by way of illustrative example with reference to the annexed drawings, in which:

FIGS. 3a to 3e show five characteristic fields for explanation of the formation of correction values.

DESCRIPTION OF THE ILLUSTRATED EMBODIMENT

Figure 1:
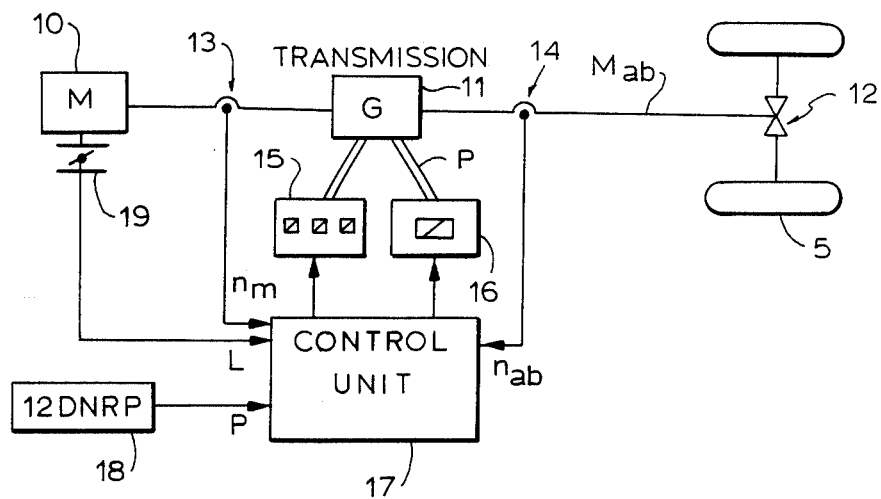
FIG. 1 is a circuit block diagram of an illustrative embodiment of a system for the practice of a method of the invention.

FIG. 1 shows motor 10 of a motor vehicle which through a transmission 11 drives wheels 4 and 5 through a drive 12 of the usual differential type. A first transducer 13 produces a signal $n_m$ corresponding to the motor speed or transmission input speed, and a second transducer 14 produces a signal corresponding to the drive speed $n_{ab}$ at the input of the drive 12, which is the transmission output speed. Gear shift valves shown in block 15, actuatable for shifting into the particular gear to be provided, and a pressure controller 16 for establishing the effective pressure p for actuating the friction elements of the transmission 11 provide the control for the transmission and are both controlled by a transmission control unit 17.

The gear shifting valves 15 are controlled by the electronically operating transmission control unit 17 in the usual way, taking account of various operating parameters of the motor in a manner which is in itself already known. of these parameters, the following are shown in FIG. 1 to be furnished to the control units 17: engine speed $n_m$, drive speed $n_{ab}$, engine load L. Also shown is the supply of a program command P from a gear shift command lever 18. A throttle position transducer 19 is symbolically shown as supplying a measure of the engine load L.

Reference is made to Bosch Technical Reports, Volume 7 (1983) No. 4 (Bosch Technische Berichte, Band 7, Heft 4) and to the prior art references given in the introduction to the specification for explanation of the basic manner of operation of setting in any particular gear, the actuation of gear shifting valves and the operation of the pressure controller 16. The necessary control functions are preferably performed in a gear shift control unit 17 constituted as an electronic microcomputer.

The method of gear shift control in accordance with the invention is all explained below in principle with reference to the signal diagram shown in FIG. 2 for the case of an up-shift operation. The adaptive control of the invention can, however, also be used for downshifts under engine-braking conditions.

Figure 2:
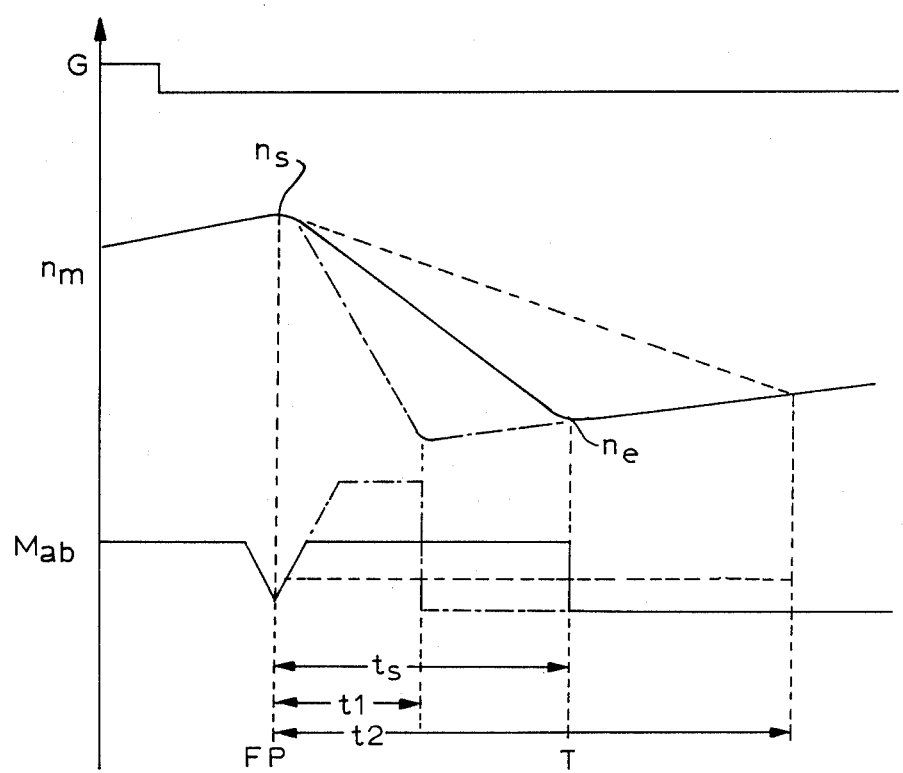
FIG. 2 is a signal diagram for explanation of the manner of operation.

At the top of FIG. 2 is shown the gear shift command signal G in the form of a downstep. After the signal G appears, the motor speeds $n_m$ rises until it reaches the free-wheeling point FP by which is meant the point at which the friction elements related to the new gear take the full engine torque and release the friction elements related to the previous gear for the idler relating thereto. From this free-wheeling point FP the motor speed $n_m$ now begins to sink, while at the same time the friction elements slip. At the instant T the new gear is set in, the friction elements grip again and the speed begins again to rise slightly.

The shift comfort is determined by the course of the drive torque. The jump in the torque at the instant T should be as small as possible. On the other hand, the loading of the friction elements is determined by the coupling torque and the slip interval $t_s$. Since, on the one hand, the slip interval should be as small as possible for this reason, and on the other hand, the torque jump should likewise be as small as possible, it is required that the control of the course of shifting should always be a compromise as is explained by comparison of the solid curves with the broken and chain-dotted curves in FIG. 2. This compromise is prescribed by a reference slip interval $t_s$. If the slip interval is too short, (t1), a torque jump that is too great results and the pressure p is reduced for the following shift operation, in order to obtain a prolongation of the slip interval. If, on the other hand, the slip interval is too long (t2), there is indeed a smaller torque jump, but this long slip time leads to heavy loading of the friction elements. The pressure p is accordingly raised for the following shift operation.

Instead of the interval during which slip occurs in the coupling, there can be used, as the magnitude characterizing the shifting operation, the shift time interval, which is to say the length of time between the gear shift signal G and the end of the slip interval, or the gradient of the motor speed $n_m$ (gear shift input speed) during the slipping of the friction elements.

For carrying out adaptive control in accordance with the invention, the reference values for the slip interval t0 are stored in a load/speed motor characteristic field as shown in FIG. 3a. The steps of load L1 to L5 and of speed n1 to n5 can be chosen in practically any way with respect to size and number of steps. In FIG. 3a, twenty-five such reference values for t0 are shown stored in a fixed-value memory, which is a component of the electronic gear shift control unit 17. The stored values are expressed in milliseconds (ms). For simplifying the representation, not all of the number values are shown. The load classes can, for example, be defined as follows: "engine" braking L1, zero load L2, small load L3, half load L4 and full load L5.

In a second characteristic field structured in exactly the same manner as the one shown in FIG. 3a, the actually measured values of the adaptation magnitude, in this case, slip interval, are stored as illustrated in FIG. 3b, in a RAM random access memory or in a non-volatile storage component, e.g., EEPROM or buffered RAM. These actual values are derived by time-wise filtering from the result of a number of shifting operations in each of the load/speed combinations of FIG. 3a. Averaging over several shifting operations, for example, can provide the filtering. The subdivision to the different fields of the raster or pattern of FIGS. 3a and 3b is the basis of selection for the microcomputer system of unit 17 in accordance with the conditions which reign of the particular shifting operation that is being performed.

In a third characteristic field, again of the same kind as the first two, correction values are finally stored for the pressure required, on the basis of stored characteristic curves or a prescribed algorithm. This is illustrated in FIG. 3c. These values are stored in a non-volatile storage unit, so that the averaging and correction value generation can be performed on the basis of stored values for any selected period of time or for a selected number of shifting operations. The correction values are raised or lowered by a corresponding number of increments in a manner dependent in each case from the amount of deviation of actual value from reference value (error signal), each increment corresponding to a particular amount of change of pressure, which in the case of FIG. 3c, is 0.1 bar.

At the beginning of adaptation, the reference values of the characteristic field (3a) are transferred to the actual value characteristic field (FIG. 3b). At the same time, all correction values in the correction value characteristic field (3c) are set to zero. After a certain amount of driving of the vehicle, the values in the actual characteristic field are changed to correspond to the measured actual value of the control magnitude, in the illustrated case, the slip interval. FIGS. 3b and 3c show the characteristic fields at a point in time t1, before the first adaptation stage is carried out, i.e., the correction values all still have the value zero, but nevertheless, valid average values are provided for the slip intervals. This is the case only for the speeds of n2 to n5, because the averaging for the speed n1 and the load L4 is not yet completed, because, for example, the necessary number of shifts under this particular speed/load combination has not yet been reached. The case where the averaging is not yet complete is recognized in the storage component by a marking bit represented in the drawing as a small dark square.

It is to be noted that in the illustrated example for the load L4, in the highest range of speed, the actual slip intervals are plainly higher than the reference values. For the load L1, the opposite holds true for the lowermost speed range.

In FIGS. 3d and 3e, the state of adaptation in characteristic fields immediately after the first adaptation step is shown. The threshold value for adaptation by one increment is here set, for example, at 40 ms, and likewise for two increments at 80 ms. For the variations represented load/speed conditions, the following adaptation effects result:

n1/L4,(average not yet valid) no adaptation
n2/L4,(deviation from reference value under threshold) no adaptation
n3/L4,correction value rise by one increment
n4/L4,correction value rise by one increment
n5/L4,correction value rise by two increments
n1/L1,correction value decrease by two increments
n2/L1,correction value decrease by two increments
n3/L1,correction value decrease by one increment
n4/L1,correction value decrease by one increment
n5/L1,(deviation from reference value below threshold), no adaptation If a correction is carried out, and therefore the correction value is changed, the actual value of the slip interval will then again be set back to the reference value and designated as not yet valid.

The number of load and speed classes can be extended or reduced to any desired extent. In the simplest case, a single reference value for the slip interval could also be used, at much sacrifice of benefits available from the invention.

Figure 4:
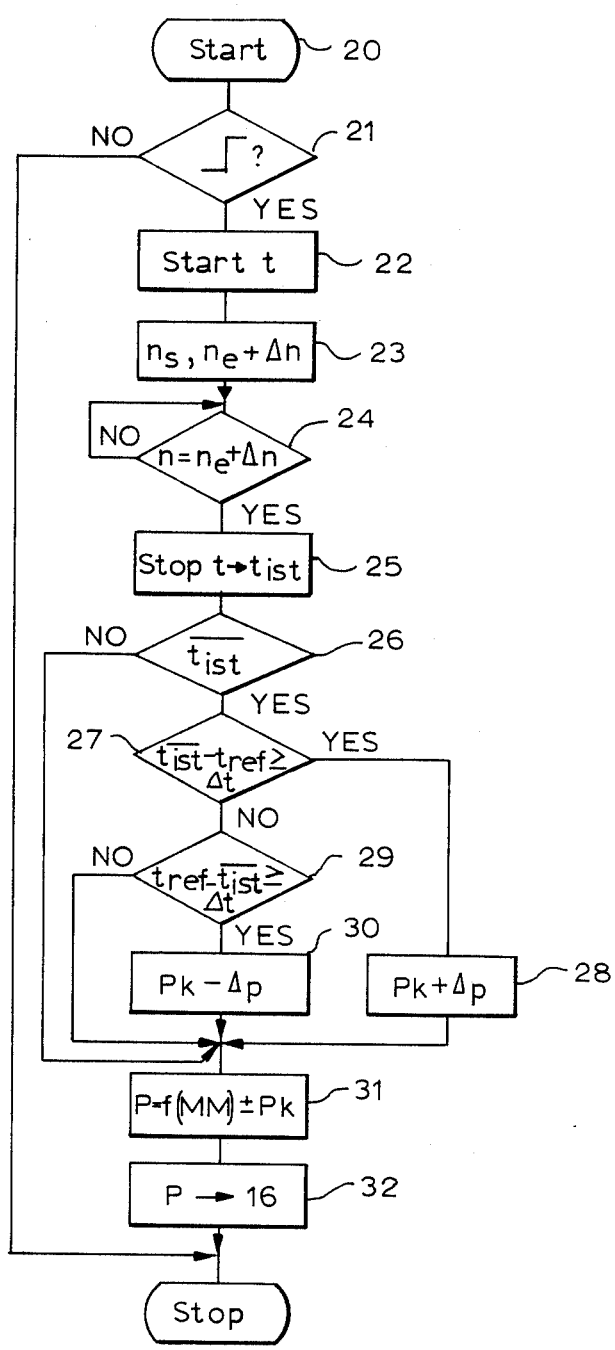
FIG. 4 is a flow diagram for explaining the sequence of the necessary operating steps.

The flow diagram shown in FIG. 4 shows an example for the course of an adaptation. This adaptation routine can preferably be contained as a subprogram in the program of the gear shift control. In this example, instead of the slip interval, the gear shift time is used as the characterizing magnitude for the gear shift operation, which is defined as the time between the appearance of a gear shift order and the end of the slip interval. In FIG. 4, accordingly the variable t is the gear shift time and not, as in FIGS. 3a-3e, the slip interval.

After the start 20 of an adaptation run, there is interrogation 21 whether a gear shift signal, in this case an upshift signal, is present. If this is the case, there is produced in the microcomputer an initiation command 22 for a timing circuit or component (not shown). Then a calculation 23 is performed by which the synchronous speed $n_s$ at the freewheeling point FP is calculated. From that, the speed $n_e$ is determined at 24 for recognition of the end of shift, the speed at which the shift operation is completed, and therefore the time at which the slip interval terminates. In order that this speed indicating end of shift should be actually reached, a small margin $\Delta n$ can be preferably prescribed, as shown at 23 and 24 so that for the recognition of the end of shift, a slightly higher speed $n_e + \Delta n$ can be required compared with the speed $n_e$.

Accordingly, the determination 24 is made by a repetitive weighting loop, in which the end of shift designated by the attainment of a speed higher by $\Delta n$ than the speed $n_e$, is awaited. When the end of shift is reached, there follows a stop command 25 for the above mentioned circuit or component (not shown), and the running time of said timing circuit or component is then stored as the actual value $t_{ist}$ is stored in the cell of the actual value storage unit corresponding to the then applicable load/speed ratio, the storage being done by carrying out averaging with the value already present there to produce the average $\bar{t}_{ist}$.

After a check step 26 in which it is determined whether there is now an actual value averaged over the necessary number of shift operations, there is a further step in which it is determined whether the shift time is too long by an amount of at least $\Delta t$, in which $\Delta t$, for example, can be 40 ms. If this is the case, there follows rise 28 by $\Delta p$ of the stored value $p_k$ of pressure correction. $\Delta p$ can, for example, be 0.1 bar. The new correction pressure is then entered as a corresponding increment in the correction characteristic field as shown in FIGS. 3c and 3e. If it is determined in an evaluation step 29, comparing the difference between the reference value $t_{ref}$ with the actual value $t_{ist}$ with the threshold difference $\Delta t$ that the shift time interval is too short, a corresponding pressure reduction 30 by $-\Delta p$ is carried out. The raising of pressure and also the reduction of pressure can, of course, also take place by multiples of $\Delta p$ when the shift time variation tolerance $\Delta t$ is exceeded 100%, 200% and so on.

In the calculation 31, the shift pressure p to be prescribed thereafter for the following shift operation is determined. This results from correcting by the corrected pressure $t_k$ a pressure f(MM) determined by stored characteristic curves or by a prescribed algorithm. The pressure value p thus obtained is then converted by the pressure controller 16 into a corresponding hydraulic pressure 32 and supplied to the transmission 11.

It is to be understood that a correction value may be zero and that in such a case a "modified" pressure determined by the correction value will be equal to the unmodified pressure.

Although the invention has been described with reference to particular illustrative example, it will be recognized that variations and modifications are possible within the inventive concept.

For example, positive and negative limit values to the correction values may be imposed, as well as a lower limit on positive and negative correction values that is implicit in the stepwise termination of correction values. It is also possible to derive the correction values from the comparison of actual and reference values by ratio to provide a multiplicative correction value instead of deriving the correction value by subtractive comparison to provide an algebraically additive correction value.

What is claimed is:

1. Method of electrically controlling an automatic stepwise-operable transmission of a motor vehicle, in which transmission gear shifting is performed by an electrically controllable, hydraulically actuatable and frictionally engageable coupling by use of a pressurized hydraulic medium, comprising the steps of:
   storing at least one predetermined reference value of a characterizing magnitude for gear shifting operations, which magnitude is dependent on the duration of slip between frictional elements of a said frictionally engageable coupling;
   measuring actual values of said characterizing magnitude;
   comparing each said actual value of said characterizing magnitude with a said stored reference value of said characterizing magnitude and deriving therefrom at least one correction value for said at least one reference value and storing said at least one correction value;

modifying the pressure of said hydraulic medium to an extent determined by the magnitude of said at least one correction value in a sense determined by the sign of said at least one correction value for bringing said actual values of said characteristic magnitude closer to said at least one reference value of said characteristic magnitude, and thereafter actuating said hydraulically actuatable couplings by said hydraulic medium at said modified pressure determined by a said stored correction value.

2. Method according to claim 1, in which said characterizing magnitude is the length of a time interval that terminates when slip ceases in a said frictionally engageable coupling.

3. Method according to claim 2 in which said time interval begins with the provision of a gear shifting command signal.

4. Method according to claim 2 in which said time interval begins with the beginning of frictional slip in said frictionally engageable coupling.

5. Method according to claim 1, in which said characterizing magnitude is the magnitude of the gradient of the transmission input shaft speed ($n_m$) during frictional slip in a said frictionally engageable coupling.

6. Method according to claim 1, in which the magnitude of said correction values is determined in a stepwise fashion from the magnitude of the difference between a reference value and an actual value compared with said reference value.

7. Method according to claim 6, in which positive and negative limits are imposed upon the magnitude of said correction values.

8. Method according to claim 1, in which the deriving of correction values is performed in said comparison step subtractively for providing an algebraically additive correction value for said reference value.

9. Method according to claim 1, in which the deriving of a said correction value in the comparison step is performed in a ratio producing manner for providing a correction value for multplicative modification of said reference value.

10. Method according to claim 1 wherein a plurality of reference values of said characterizing magnitude are stored, said reference values being respectively related with plurality of sets of vehicle motor operating conditions for being individually callable from storage by addressing a said set of vehicle motor operating conditions, each of said sets of vehicle motor operating conditions comprising at least a reference value representive of a motor speed range and a reference value representive of a motor load range, the step of measuring actual values of said characterizing magnitude being performed in a manner identifying for each actual value measured the said set of vehicle operating conditions designating the motor operating conditions under which said actual value was measured and performing the step of comparing actual and reference values of said characterizing magnitude by comparing each actual value with the particular reference value which, as stored, is addressable by that set motor operating conditions designated as being the motor operating conditions under which the actual value was measured.

11. Method according to claim 10 in which said averaging of said actual values is performed with the provision of an indication whether a predetermined number of said actual values has been averaged for indication whether or not the adaptive establishment of said correction values has reached a desired state of completeness.

12. Method according to claim 11 in which after said averaging step has been performed for a predetermined number of shifting operations under one of said sets of conditions, averaging with respect to gear shifting operations under said one set of conditions is discontinued at least temporarily.

13. Method according to claim 11, in which a said correction value is not replaced by another correction value until the averaging step has been performed over a predetermined number of measured actual values of the same one of said sets of vehicle motor operating conditions.

14. Method according to claim 10, in which non-volatile storage units are utilized for storing said actual values and correction values in a manner correlated to said sets of motor operating conditions.

15. Method according to claim 10 in which the step of modifying the pressure of said hydraulic medium to an extent determined by the magnitude of a correction value is performed by adding, to the reference value of said characterizing magnitude for a said set of vehicle motor operating conditions, a magnitude produced by multiplicative combination of said correction value (K) with a fixed absolute incremental value corresponding to an absolute value of pressure increment ($\Delta p$).

16. Method according to claim 10, wherein the actual values of said characterizing magnitude resulting from said measuring step are stored in an addressable manner correlated with the said set of vehicle motor operating conditions designating the conditions under which said actual value was measured, said actual values being stored in a storage unit constituted for storing a predetermined number of most recent actual values for each of said sets of vehicle motor operating conditions and wherein after the step of measuring and storing actual values of said characterizing magnitude and before the step of comparing an actual value with a said stored reference value, there are performed the steps of:

determining when each actual value measured is stored whether said pretermined number of actual values has been stored in a portion of said storage unit addressable by the set of vehicle motor operating conditions under which the actual value just measured and stored was measured, and in the event said predetermined number of actual values have not been stored in said portion of said storage unit, omitting the value comparing step and the pressure modifying step and, in the event of said predetermined number of actual values have been stored in said portion of said storage unit, averaging said predetermined number of actual values so stored to produce an average actual value, and utilizing said average actual value for comparison with a said reference value addressable by the same set of motor operating conditions as said portion of said storage unit in which the actual values producing said average actual value were stored.

17. Method according to claim 16 in which said characterizing magnitude is the length of a time interval that terminates when slip ceases in a said frictionally engageable coupling.

18. Method according to claim 17, in which said time interval begins with the provision of a gear shifting command signal.

19. Method according to claim 17, in which said time begins with the beginning of frictional slip in said frictionally engageable coupling.

20. Method according to claim 16, in which said characteristic magnitude is the magnitude of the gradient of the transmission input shaft speed ($n_m$) during frictional slip in said frictionally engageable coupling.

21. Method according to claim 16, in which the magnitude of said correction values is determined in the stepwise fashion from the magnitude of the difference between a said reference value and a said actual value compared with said reference value.

22. Method according to claim 21, in which positive and negative limits are imposed upon the magnitude of said correction values.

23. Method according to claim 16, in which the deriving of correction values is performed in said comparison step subtractively for providing an algebraically additive correction value for a said reference value.

24. Method according to claim 16, in which the deriving of a said correction value in the comparison step is performed for providing a correction value for multiplicative modification of a said reference value.

25. Method according to claim 16, in which the step of modifying the pressure of said hydraulic medium to an extent determined by the magnitude of a correction value is performed by adding, to the reference value of said characterizing magnitude for a said set of vehicle motor operating conditions, a magnitude produced by multplicative combination of said correction value (K) with a fixed absolute incremental value corresponding to an absolute value of pressure increment ($\Delta p$).

26. Method according to claim 10 in which said characterizing magnitude is the length of a time interval that terminates when slip ceases in a said frictional engageable coupling.

27. Method according to claim 26, in which said time interval begins with the provision of a gear shifting command signal.

28. Method according to claim 26, in which said time interval begins with the beginning of frictional slip in said frictionally engageable coupling.

29. Method according to claim 10, in which said characteristic magnitude is the magnitude of the gradient of the transmission input shaft speed ($n_m$) during frictional slip in a said frictionally engageable coupling.

30. Method according to claim 10, in which the magnitude of said correction values is determined in a stepwise fashion from the magnitude of the difference between the said reference value and a said actual value compared with said reference value.

31. Method according to claim 30, in which positive and negative limits are imposed upon the magnitude of said correction values.

32. Method according to claim 10, in which the deriving of correction values is performed in said comparison step subtractively for providing an algebraically additive correction value for a said reference value.

33. Method according to claim 10, in which the deriving of a said correction value in the comparison step is performed in a ratio producing manner for providing a correction value for multiplicative modification of a said reference value.

34. A method according to claim 1, wherein, between the step of measuring the actual values of said characterizing magnitude and the step of comparing each said actual value with a said stored reference value, there are performed the steps of:
- storing the measured actual values of said characterizing magnitude in a storage unit constituted for containing up to a predetermined number of most recent previous actual values;
- determining, when each actual value of said characterizing magnitude is measured and stored, whether the said predetermined number of actual values has been stored in said storage unit, and
- in the event that said previous determined number of previous actual values has been stored, averaging the stored actual values to produce and average actual value,
- and wherein the step of comparing an actual value of said characterizing magnitude with a stored reference value thereof is performed by using said average actual value for comparison with a said stored reference value for deriving a correction value for said stored reference value.

* * * * *